(12) United States Patent
Ho et al.

(10) Patent No.: US 10,591,983 B2
(45) Date of Patent: Mar. 17, 2020

(54) COMPUTER ACCELERATOR SYSTEM USING A TRIGGER ARCHITECTURE MEMORY ACCESS PROCESSOR

(71) Applicant: Wisconsin Alumni Research Foundation, Madison, WI (US)

(72) Inventors: Chen-Han Ho, Madison, WI (US); Karthikeyan Sankaralingam, Madison, WI (US); Sung Kim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1075 days.

(21) Appl. No.: 14/212,676

(22) Filed: Mar. 14, 2014

(65) Prior Publication Data
US 2015/0261528 A1    Sep. 17, 2015

(51) Int. Cl.
*G06F 9/38*     (2018.01)
*G06F 1/3293*   (2019.01)

(52) U.S. Cl.
CPC .......... *G06F 1/3293* (2013.01); *G06F 9/3881* (2013.01)

(58) Field of Classification Search
CPC ....... G06F 9/355; G06F 9/3881; G06F 9/3877
See application file for complete search history.

(56) References Cited

U.S. PATENT DOCUMENTS

| | | | | |
|---|---|---|---|---|
| 7,590,823 B1 * | 9/2009 | Ansari | | G06F 9/3877 712/200 |
| 8,447,957 B1 * | 5/2013 | Carrillo | | G06F 9/3455 712/14 |
| 2003/0152076 A1 * | 8/2003 | Lee | | G06F 9/3885 370/389 |
| 2003/0188127 A1 * | 10/2003 | So | | G06F 9/3861 712/34 |
| 2004/0263521 A1 * | 12/2004 | Booth, Jr. | | G06F 9/3879 345/520 |
| 2006/0251092 A1 * | 11/2006 | Matterne | | G06F 9/3879 370/412 |
| 2007/0245123 A1 * | 10/2007 | Stuttard | | G06F 9/3001 712/22 |
| 2007/0250681 A1 * | 10/2007 | Horvath | | G06F 9/30036 712/4 |

(Continued)

OTHER PUBLICATIONS

A. Parashar et. al., "Triggered instructions: A control paradigm for spatially-programmed architectures," in Proceedings of the 40th Annual International Symposium on Computer Architecture, ser. ISCA'13. New York, NY, USA, ACM, 2013, pp. 143-153.*

(Continued)

*Primary Examiner* — Jacob Petranek
(74) *Attorney, Agent, or Firm* — Boyle Fredrickson, SC

(57) ABSTRACT

A specialized memory access processor is placed between a main processor and accelerator hardware to handle memory access for the accelerator hardware. The architecture of the memory access processor is designed to allow lower energy memory accesses than can be obtained by the main processor in providing data to the hardware accelerator while providing the hardware accelerator with a sufficiently high bandwidth memory channel. In some embodiments, the main processor may enter a sleep state during accelerator calculations to substantially lower energy consumption.

20 Claims, 5 Drawing Sheets

(56) References Cited

U.S. PATENT DOCUMENTS

| | | | |
|---|---|---|---|
| 2008/0065713 A1* | 3/2008 | Lee | G06F 7/728 708/491 |
| 2008/0244238 A1 | 10/2008 | Mitu | |
| 2013/0124805 A1* | 5/2013 | Rafacz | G06F 13/1626 711/151 |
| 2014/0136858 A1* | 5/2014 | Jacobson | G06F 9/46 713/300 |
| 2014/0181427 A1* | 6/2014 | Jayasena | G06F 9/3004 711/154 |
| 2015/0261528 A1 | 9/2015 | Ho et al. | |
| 2015/0268963 A1 | 9/2015 | Etsion et al. | |
| 2017/0024167 A1 | 1/2017 | Lavasani | |

OTHER PUBLICATIONS

N. Clark et al.; "Optimode: Programmable accelerator engines through retargetable customization," in Hot Chips 15; pp. 1-19; Aug. 2004; Michigan.

J. B. Dennis et al.; "A preliminary architecture for a basic data-flow processor" in Proceedings of the 2Nd Annual Symposium on Computer Architecture, ser. ISCA '75. New York, NY, USA: ACM, 1975, pp. 126-132.

V. Govindaraju et al.; "Dynamically specialized datapaths for energy efficient computing," in High Perforamnce Computer Architecture (HPCA), 2011 IEEE 17th International Symposium on, 2011, pp. 503-514; Madison, WI.

A. Lukefahr et al.; "Composite cores: Pushing heterogeneity into a core," in Proceedings of the 2012 45th Annual IEEE/ACM International Symposium on Microarchitecture, ser. MICRO '12. Washington, DC, USA: IEEE Computer Society, 2012, pp. 317-328.

A. Parashar et al.; "Triggered instructions: A control paradigm for spatially-programmed architectures," in Proceedings of the 40th Annual International Symposium on Computer Architecture, ser. ISCA'13. New York, NY, USA: ACM, 2013, pp. 142-153.

K. Sankaralingam et al.; "Exploiting ILP, TLP and DLP with the Polymorphous TRIPS Architecture," in ISCA '03: Proceedings of the 30th Annual International Symposium on Computer Architecture, Jun. 2003, pp. 422-433; Austin, TX.

J. E. Smith; "Decoupled access/execute computer architectures," in Proceedings of the 9th Annual Symposium on Computer Architecture,ser. ISCA '82. Los Alamitos, CA, USA: IEEE Computer Society Press, 1982, pp. 112-119.

International Search Report dated Sep. 27, 2018; 16 pages.

Venkatesh et al."Conservation cores: reducing the energy of mature computations." In ACM SIGARCH Computer Architecture News, vol. 38, No. 1, pp. 205-218. ACM, 2010. US.

Fan et al. "Increasing hardware efficiency with multifunction loop accelerators." In Hardware/Software Codesign and System Synthesis, 2006. CODES+ ISSS'06. Proceedings of the 4th International Conference, pp. 276-281. IEEE, 2006. US.

\* cited by examiner

COMPUTER ACCELERATOR SYSTEM USING A TRIGGER ARCHITECTURE MEMORY ACCESS PROCESSOR

STATEMENT REGARDING FEDERALLY SPONSORED RESEARCH OR DEVELOPMENT

This invention was made with government support under 0917238 and 1228782 awarded by the National Science Foundation. The government has certain rights in the invention.

CROSS REFERENCE TO RELATED APPLICATION

Background of the Invention

The present invention relates to computer architectures and in particular to an architecture in which a main processor works with an accelerator processor through an access processor for faster and more efficient processing.

Hardware accelerators help boost computer performance for specialized tasks by allowing a main processor to off-load, for example, the processing of floating-point or graphics calculations. The architecture of the hardware accelerator is normally different from the architecture of the main processor to allow it to run some tasks faster than the main processor while omitting capabilities available in the main processor.

Current practice is to tightly integrate hardware accelerators with a high performance out-of-order (OOO) processor, the latter used for non-accelerated, general computational tasks. In operation, the hardware accelerator executes particular computational tasks on demand from the main processor as the main processor feeds data to the hardware accelerator at a high rate sufficient to fully utilize the hardware accelerator capabilities.

Using a main, out-of-order processor for the focused task of feeding data to the accelerator consumes substantial energy in the main processor and limits energy efficiency that would otherwise be gained from acceleration. More energy-efficient, in-order processors could reduce this energy consumption; however, such in-order processors normally provide insufficient performance to keep up with the data needs of the hardware accelerator and may not provide the desired performance for general computational tasks.

SUMMARY OF THE INVENTION

The present invention provides a specialized access processor that takes over the job of providing data to the hardware accelerator from the main processor. The access processor, like the accelerator, is specialized to a narrow task, in this case performing memory access and address calculations, and thus can be more efficient yet as fast as the main out-of-order processor. The main out-of-order processor, free from memory access duties, may switch to an energy conserving sleep mode until the accelerator processor is done, or may move to other tasks.

Specifically, in one embodiment, the invention provides a computer having a first, main processor communicating with an external memory and including circuitry to provide execution of a first set of standard computer instructions and circuitry for the exchange of data with the external memory. The computer also provides a second, accelerator processor communicating with the main processor and including circuitry to provide execution of a second set of accelerator computer instructions providing the execution of functions at an accelerated rate compared to the execution of those functions on the main processor. A third, memory access processor communicates with the main processor and the accelerator processor and includes circuitry to provide for the execution of a third set of memory access instructions. The memory access processor operates to receive the memory access instructions from the main processor to exchange data between the accelerator processor and external memory via the memory access processor according to those memory access instructions during operation of the accelerator processor.

It is thus a feature of at least one embodiment of the present invention to off-load memory access tasks required by a hardware accelerator to a specialized memory access circuit that can execute these memory access tasks more efficiently.

The circuitry of the memory access processor may use less power in the exchange of data between the second processor and external memory than the main processor.

It is thus a feature of at least one embodiment of the present invention to reduce the energy penalty that occurs when a complex main processor is employed during hardware acceleration to perform simple memory access tasks.

The main processor may be an out-of-order processor speculatively executing instructions out of program order.

It is thus a feature of at least one embodiment of the present invention to provide for improved performance in common high-powered out-of-order processors.

The memory access processor may employ a trigger architecture for sequencing through the third set of memory access instructions without a program counter.

It is thus a feature of at least one embodiment of the present invention to provide an architecture for the access processor that can readily compete with the speed of an out-of-order processor for memory access tasks.

The memory access instructions may include a list of trigger events and responses where the trigger events include the availability of data from the accelerator or memory and the responses include moving data between the accelerator and external memory.

It is thus a feature of at least one embodiment of the present invention to provide an architecture that lends itself to concurrent yet low-powered memory access operations.

The memory access instructions may provide a data flow fabric configuration for calculating addresses in the external memory.

It is thus a feature of at least one embodiment of the present invention to allow its use with a versatile, high-speed data flow fabric architecture.

The main processor may provide the second set of accelerator computer instructions to the accelerator processor.

It is thus a feature of at least one embodiment of the present invention to permit the main processor to directly communicate with the accelerator processor for the purpose of programming the accelerator processor, preserving versatile implementation of accelerator hardware under the main computer control.

The computer may operate to shut down the main processor during operation of the memory access processor.

It is thus a feature of at least one embodiment of the present invention to provide increased energy savings when using accelerator hardware.

The accelerator processor may not include circuitry for the exchange of data with the external memory.

It is thus a feature of at least one embodiment of the present invention to work with standard hardware accelerators that expect close integration with the general-purpose computer.

The main processor may provide initial memory access data to the memory access processor.

It is thus a feature of at least one embodiment of the present invention to permit a memory access processor having a simple structure with limited functionality, as is possible because of close coupling with the main processor which can initialize and configure the memory access processor.

The third set of memory access instructions may be limited to those needed to provide iterative calculation of memory addresses in a predictable pattern of offsets starting with the initial memory access data provided from the main processor.

It is thus a feature of at least one embodiment of the present invention to exploit the observation that there are significant memory access tasks associated with a wide variety of hardware acceleration that fall into fairly simple patterns requiring reduced computational ability.

The accelerator processor may be selected from the group consisting of an arithmetic coprocessor, a graphic coprocessor, a streaming processor, and a neural net processor.

It is thus a feature of at least one embodiment of the present invention to provide a system that works for a wide variety of different hardware accelerators.

The main processor may send memory access instructions to the third processor based on compiler-generated instructions in a program executed by the main processor.

It is thus a feature of at least one embodiment of the present invention to provide a simplified hardware possible through precompiled configuration code.

These particular objects and advantages may apply to only some embodiments falling within the claims and thus do not define the scope of the invention.

DETAILED DESCRIPTION OF THE PREFERRED EMBODIMENT

Figure 1:
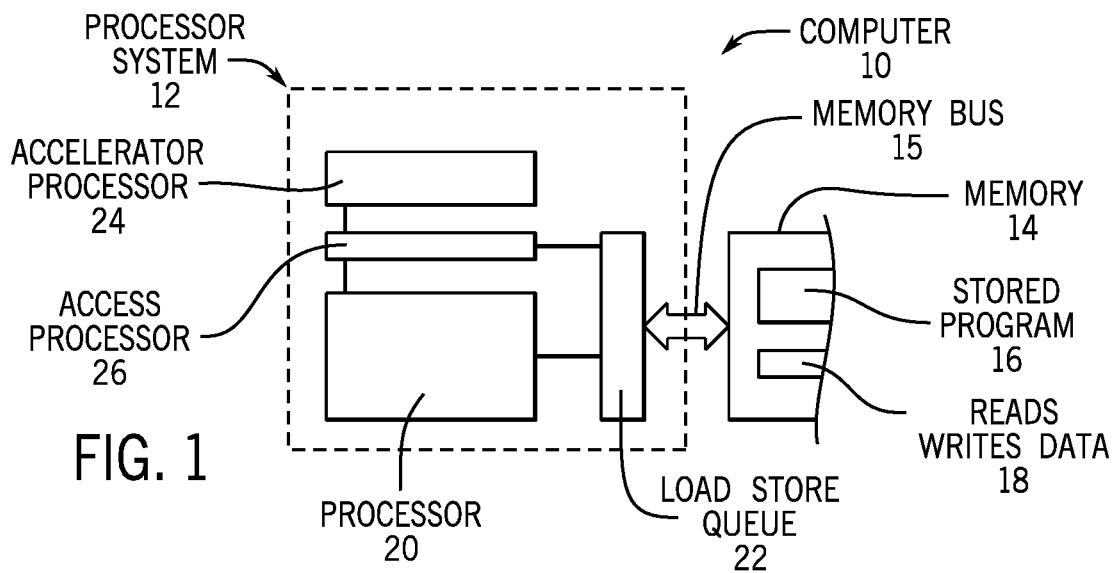
FIG. 1 is a functional block diagram of the invention showing a main processor communicating with an accelerator processor through an access processor where the access processor and main processor provide connections to an external memory.

Referring now to FIG. 1, an electronic computer 10 may include a processor system 12 communicating with a memory 14 to execute a stored program 16 in the memory 14 that reads and writes data 18 in the memory 14. Memory 14 may be any of a wide variety of different memory types and combinations including hierarchies of solid-state and magnetic memory including multiple levels of memory caches as is generally understood in the art.

The processor system 12 may provide multiple processors including a general processor 20 communicating with the memory 14. The general processor 20 may be an out-of-order processor capable of speculatively executing instructions of the stored program 16 out-of-order for high-speed execution using techniques generally understood in the art. The general processor 20 will in this regard provide a complete instruction set generally suitable for the execution of general stored programs 16. The general processor 20 connects to a load store queue 22 which in turn communicates with the memory 14 through a memory bus 15 allowing memory access (storing and loading data) by the general processor 20.

The processor system 12 may also include an accelerator processor 24 normally employing a different architecture from the general processor 20 and typically using a relatively small instruction set generally not suitable for execution of the general stored program 16 except for specific accelerator regions of that program to be discussed. Generally, the accelerator processor 24 is selected to operate in a decoupled access execute model in which memory access responsibilities are provided by a different device (for example, the general processor 20) and execution responsibilities are handled independently of this other different device by the accelerator processor 24. In this regard, the accelerator processor 24 generally does not have a provision for memory access and does not communicate or have circuitry to communicate with the load store queue 22.

The accelerator processor 24, for example, may be an arithmetic coprocessor, a graphic coprocessor, a streaming processor, a neural net processor or other accelerator designs. Example accelerator processors 24 include, but are not limited to, a device based on: the Convolution Engine accelerator described in W. Qadeer, R. Hameed, O. Shacham, P. Venkatesan, C. Kozyrakis, and M. A. Horowitz, "Convolution engine: Balancing efficiency & flexibility in specialized computing," in Proceedings of the 40th Annual International Symposium on Computer Architecture, ser. ISCA '13, New York, N.Y., USA: ACM, 2013, pp. 24-35; the Outrider accelerator described in N. C. Crago and S. J. Patel, "Outrider: Efficient memory latency tolerance with decoupled strands," in Proceedings of the 38th Annual International Symposium on Computer Architecture, ser. ISCA '11, New York, N.Y., USA: ACM, 2011, pp. 117-128; the Conservation Cores accelerator described in G. Venkatesh, J. Sampson, N. Goulding, S. Garcia, V. Bryksin, J. Lugo-Martinez, S. Swanson, and M. B. Taylor, "Conservation Cores: Reducing the Energy of Mature Computations," in ASPLOS '10; the DySER accelerator described in V. Govindaraju, C.-H. Ho, and K. Sankaralingam, "Dynamically specialized datapaths for energy efficient computing," in High Performance Computer Architecture (HPCA), 2011 IEEE 17th International Symposium on, 2011, pp. 503-514; and the NPU accelerator described in H. Esmaeilzadeh, A. Sampson, L. Ceze, and D. Burger, "Neural acceleration for general-purpose approximate programs," in Proceedings of the 2012 45th Annual IEEE/ACM International Symposium on Microarchitecture, ser. MICRO '12. Washington, D.C., USA: IEEE Computer Society, 2012, pp. 449-460, all hereby incorporated by reference as well as the SSE/AVX accelerator generally understood in the art.

The processor system 12 of the present invention supplements the general processor 20 and accelerator processor 24 with a memory access processor 26, the latter of which mediates between the general processor 20 and the accelerator processor 24 to provide memory access between the accelerator processor 24 and external memory 14 (via the load store queue 22). This memory access is according to instructions provided by the general processor 20 and executed by the access processor 26. The access processor 26 may in some embodiments provide instructions limited to three primitive tasks of (i) computation to generate recurring address patterns/branches; (ii) managing and triggering recurring events related to the arrival of values from memory or the accelerator; and (iii) moving information between memory and the accelerator. As noted above, the access processor 26, through specialization, may provide for high-speed but lower power consumption for memory access tasks than provided by the general processor 20.

The access processor 26 independently manages memory access tasks without ongoing supervision by the general processor 20. This allows the general processor 20 to move into a sleep state or pursue other tasks during this memory access processing.

Figure 2:
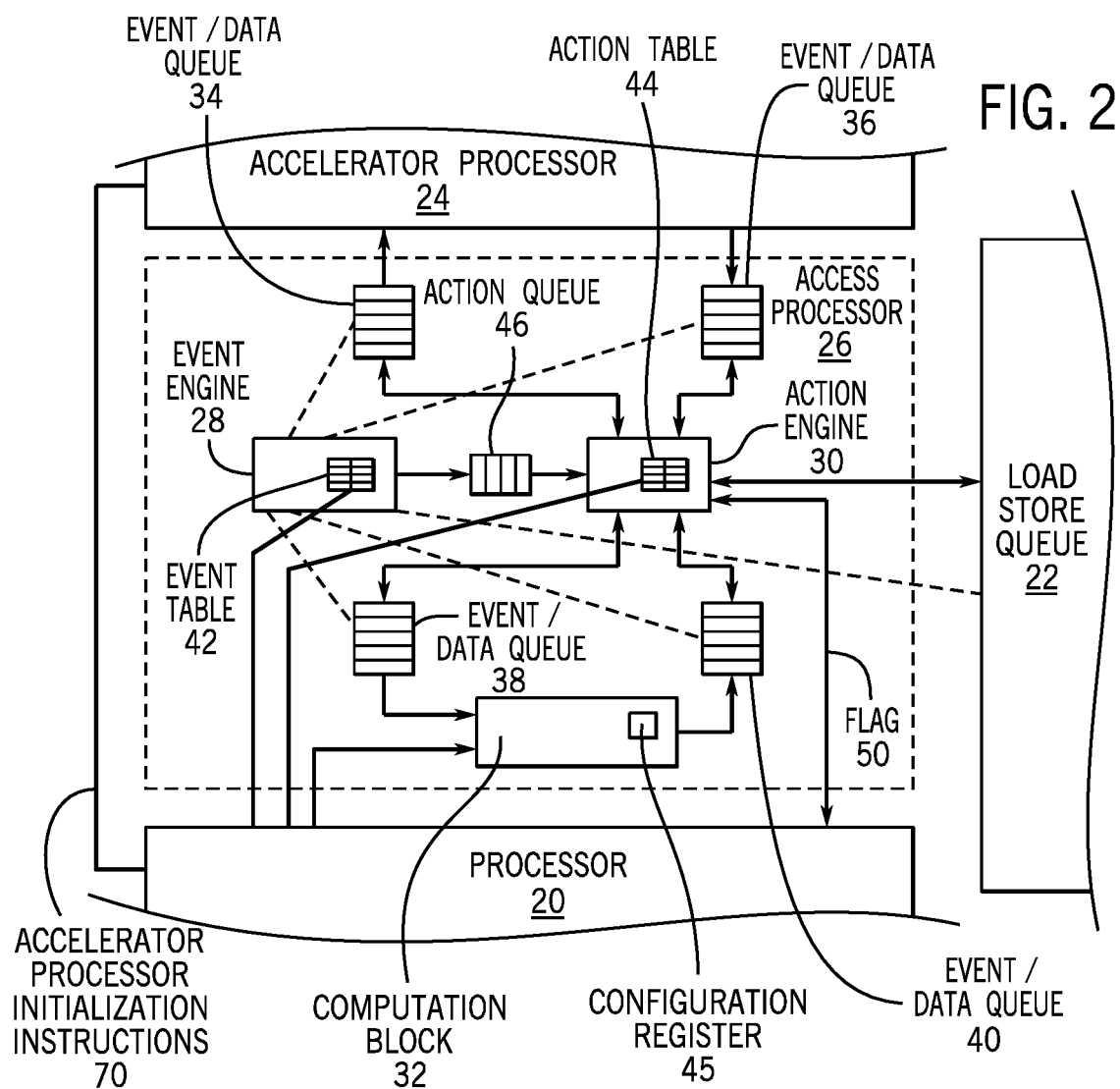
FIG. 2 is a detailed block diagram of the access processor FIG. 1 showing event/data registers for communicating data and storing events, an event engine, an action engine and a calculation block used for memory access tasks.

Referring now to FIG. 2, in one embodiment, the access processor 26 may employ a trigger architecture that eliminates the need for a program counter (as well as fetch, decode, register access, re-order buffers and other structures necessary for out-of-order processors) and in this way attain high-speed low-power operation. In this trigger architecture, certain triggering events are detected by an event engine 28 that triggers corresponding actions from action engine 30. The actions generally involve the movement of data between accelerator processor 24 and the load store queue 22 as will be discussed.

Calculations necessary for the addressing of data in these actions are provided by a computation block 32 which may, for example, be a data flow fabric for high-speed asynchronous calculation. Alternatively, the computation block 32 may employ a Subgraphs Execution Block as described in S. Gupta, S. Feng, A. Ansari, S. Mahlke, and D. August, "Bundled execution of recurring traces for energy-efficient general purpose processing," in Proceedings of the 44th Annual IEEE/ACM International Symposium on Microarchitecture, ser. MICRO-44 '11, 2011, pp. 12-23. Generally the computation block 32 may provide for computational parallelism for high performance.

During operation, the access processor 26 may communicate with the accelerator processor 24 through output event/data queue 34 and input event/data queue 36 providing data to and receiving data from the accelerator processor 24 in a first-in, first-out (FIFO) queue structure. This queue structure provides for a high-speed data exchange between the access processor 26 and the accelerator processor 24 with data from the output event/data queue 34 readable by the accelerator processor 24 to obtain data for accelerator calculations and with results from the accelerator processor 24 being provided to event/data queue 36.

Similar events/data queues 38 and 40 are used to hold data passing to and from the computation block 32.

Generally each of the event/data queues 34, 36, 38, 40 may also store trigger states related to contained memory data exchanged with external memory 14 or to loop data calculated by the computation block 32 related to the determination of memory addresses. In this latter case, either the particular loop data or a test of the loop data may be stored in the event data queue.

The event trigger states may include a ready bit (indicating associated memory data is available to be transferred) and a valid bit (indicating that a test of loop data has been updated). These event states and the associated data may be read by the event engine 28 to trigger actions by the action engine 30 as will be described. After the event states have been processed, the associated memory may be moved from the queue or the test of loop data marked as invalid.

Event engine 28 includes an event table 42 that may be loaded by the general processor 20 to define events that will trigger the actions needed for the accessing of memory 14. The event engine 28 communicates actions to the action engine 30 through an action queue 46 which allows the action engine 30 to enforce a priority on actions as may be necessary in some conditions to prevent indeterminate race conditions (generally in the case where there are multiple simultaneous actions).

The action engine 30 includes an action table 44 also loaded by the general processor 20 and describing the actions (typically data movement) that will occur in response to a given event. In addition, the action engine 30 may communicate via a completion flag 50 to the general processor 20 to start and stop the operation of the access processor 26.

The computation block 32 may include a configuration register 45, also loaded by the general processor 20 either directly or through actions of the action engine 30, that describe calculations needed for computation of a series of addresses for memory access. The general processor 20 may provide for starting calculation values to the computation block 32.

Figure 3:
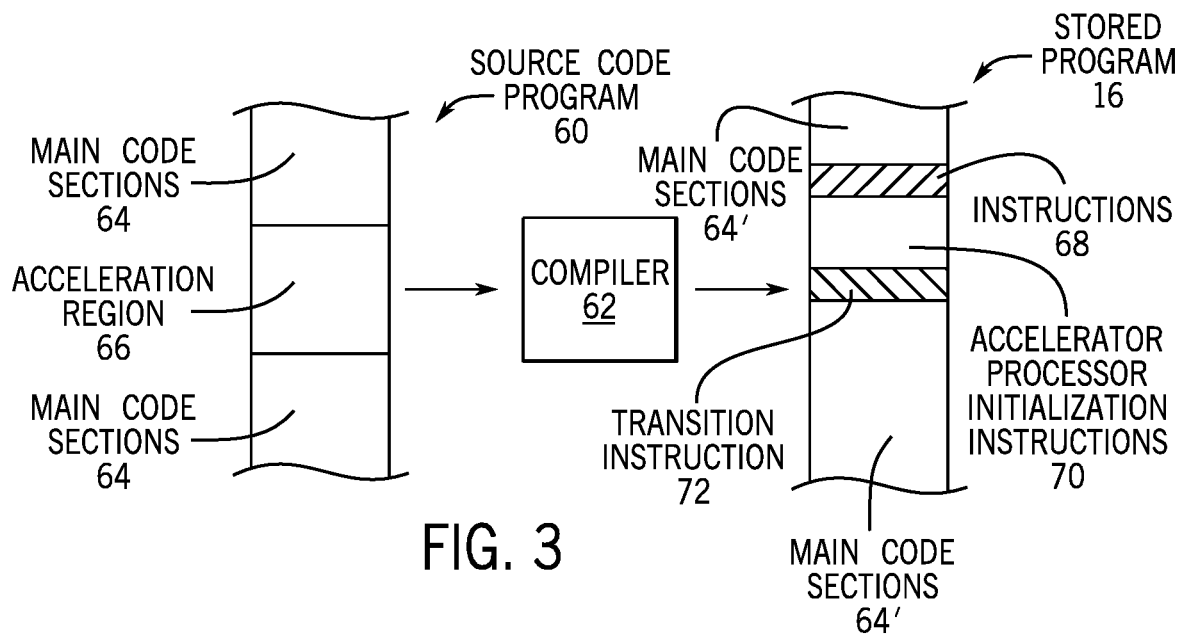
FIG. 3 is a processing diagram depicting compilation of a source code program having an acceleration portion for processing by the accelerator processor showing specialized source code for programming and operating the access processor of the present invention.
Figure 4:
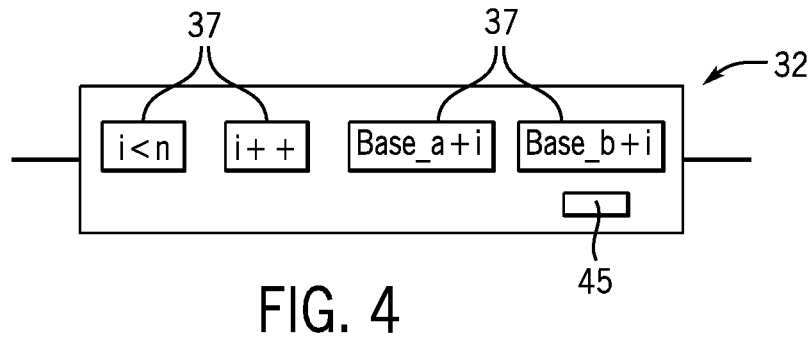
FIG. 4 is a block diagram of the calculation block of FIG. 2 as configured for an example memory access task.

Referring now to FIGS. 1, 2 and 3, a source code program 60 for execution by the computer 10 may have multiple instructions in main code sections 64 for execution by the general processor 20 and multiple instructions in one or more acceleration regions 66 for execution by the accelerator processor 24. A compiler 62 processes this source code program 60 to generate compiled object code of the stored program 16 having main code sections 64' (corresponding generally to main code sections 64) and, in place of the acceleration region 66, to insert access processor initialization instructions 68, accelerator processor initialization instructions 70, and transition instruction 72.

The access processor initialization instructions 68 extract from the acceleration regions 66 information to be transmitted from the general processor 20 to the access processor 26 to properly load the event table 42, the action table 44, and the configuration register 45, as well as and to provide beginning state data to the computation block 32. The access processor initialization instructions 68 provide the access processor 26 with the necessary programming that allows it to implement memory access tasks for the accelerator processor 24 that would otherwise be executed by the general processor 20 were it communicating directly with the accelerator processor 24.

The accelerator processor initialization instructions 70 also extracted from the acceleration region 66 provide programming to the accelerator processor 24 necessary for it to implement accelerator functions of the acceleration region 66. These instructions are transmitted directly from the general processor 20 to the accelerator processor 24 as shown in FIG. 2.

The accelerator processor initialization instructions 70 are followed by transition instruction 72 which use the data flag 50 to begin operation of the access processor 26 and move the general processor 20 to a sleep state and then to awake the general processor 20 from the sleep state after completion of the acceleration region 66. As is understood in the art, the sleep state generally preserves the architectural state of the general processor 20 allowing it to resume operation rapidly. When this flag 50 is reset at the completion of execution of the acceleration process of the acceleration region 66, the program resumes execution of the next main code sections 64'.

Referring now to FIGS. 1, 4, 5 and 6, execution of a simple acceleration process of acceleration region 66 may be represented in a simplified example by the code sequence:

```
for (i=0; i<n; i++) {
a[i]=accel(a[i], b[i])
}
```

In this code sequence, which might be implemented by the acceleration region 66, a generalized acceleration process is represented by a stylized function accel( ). The function accel( ) operates on data from operand arrays a[i], b[i] obtained from memory 14 where i ranges from zero to n and stores the result in a[i] in memory 14. This loop requires multiple memory loads and stores in a regular reoccurring pattern that can be handled readily by the architecture of the access processor 26. The function accel( ) is intended to represent a wide range of different acceleration tasks that receive arguments and is provided for the purpose of demonstrating operation of the access processor 26 produce resulting values and should not be considered limiting.

In order to implement this memory access pattern, the general processor 20 will program the access processor 26 by loading the event table 42 and the action table 44 and the configuration register 45 of the computation block 32.

In this case, the computation block 32 is a program to perform, in parallel, four computational tasks 37. The first computational task 37 performs the operation of testing whether the index variable i initialized by the general processor 20 is less than n (a constant loaded by the general processor 20). This operation is represented by the test condition which also implements inherently the test condition of i<=i. The initial value of i is loaded by the general processor 20.

The second computational task 37 is incrementing i by one (represented by i++). The third and fourth computational tasks 37 calculate a memory address for each value of the array a[i] (represented by the calculation Base_a+i) where Base_a is the base address of the starting location of array a[i] as loaded by the processor 20 and perform a similar calculation for array b[i] (represented by a calculation Base_b+i) where Base_a is the base address of the starting location of array b[i] also loaded by the processor 20.

Figure 5:
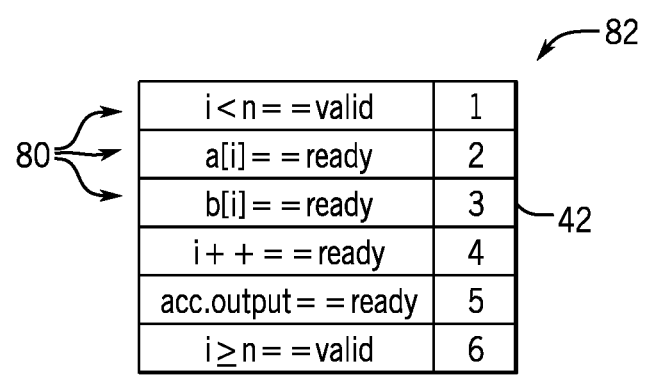
FIG. 5 is a logical diagram of an event table used by the event engine of FIG. 2.

The event table 42 is loaded with six events 80 (given corresponding actions 82 from 1 to 6 in this example) as shown in FIG. 5. Event 1 tests whether the computation block 32 has produced a new (valid) test of the loop condition calculation i<n with a "true" result for this expression. Events 2 and 3 test whether a new memory addresses for arrays a[i] and b[i] (based on index i) have been calculated based on a new value of i. Event 4 tests whether an incremented value of i has been calculated. Each of the above events may be detected by looking at the event/data queue 40 as updated by the computation block 32.

Event 5 checks to see whether a new output is available from the accelerator processor 24 (based on previous inputs through event/data queue 34) and is tested by looking at the event/data queue 36. Finally, event 6 checks whether the memory access tasks delegated to the access processor 26 by the main processor 20 are complete based on whether the computation block 32 has produced a new (valid) test of the loop condition calculation i<n with a "false" result for this expression.

For each detected event, the corresponding action 82 is output to the action queue 46.

The action table 44 determines the appropriate action task to be performed by the action engine 30 to respond to identified actions as received from the action queue 46, in this example the action table 44 is loaded with five action tasks 83 each associated with one or more actions 82 and represented by a different table row. The first action task 83 associated with actions 1 and 2 loads the resolved address of array element a[i] from the load store queue 22 and moves it to the accelerator processor 24 through event/data queue 34. The second action task 83 associated with actions 1 and 3 loads the resolved address of array element b[i] from the load store queue 22 to the accelerator processor 24 through the event/data queue 34. The third action task 83 stores an output of accelerator processor 24 in response to action 5 through the load store queue 22 in memory address a[i]. The fourth action task 83 responds to actions 1 and 4 to move a new value of i++ to the register holding i in the computation block 32. The sixth action task 83 responds to an equality between i and n to signal that the memory access task is complete causing the general processor 20 to resume execution and the access processor 26 to stop.

Figure 7:
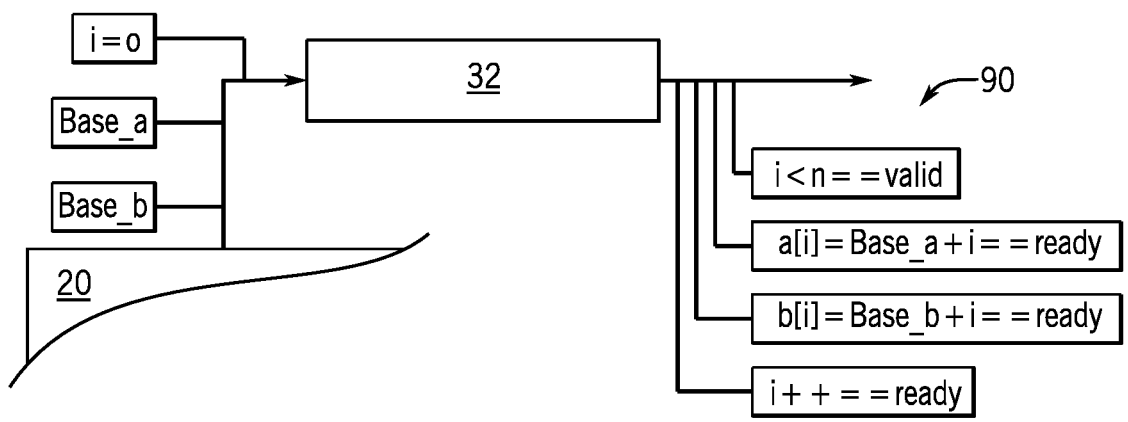
FIG. 7 is a fragmentary view of FIG. 2 showing initialization data transmitted to the access processor by the main processor to the calculation block such as generates a series of events.

Referring now to FIGS. 3 and 7, when the general processor 20 arrives at instructions 68, the above programming by loading or configuring event table 42, action table 44, and a calculation block configuration register 45 is performed by the general processor 20. General processor 20 then loads the base addresses Base_a and Base_b and an initial value i=0 in the computation block 32 and sets the flag 50 to begin operation of the access processor 26. The processors 20 may then go to a sleep state or may pursue other tasks.

The computation block 32 immediately provides a set of output events 90 corresponding to the first four events of the event table 42, testing the index variable i and finding it less than n and calculating the new addresses for arrays a and b and incrementing the index variable i. These new outputs are sent to the event/data queue 40 and marked as valid or ready as appropriate.

Figure 8:
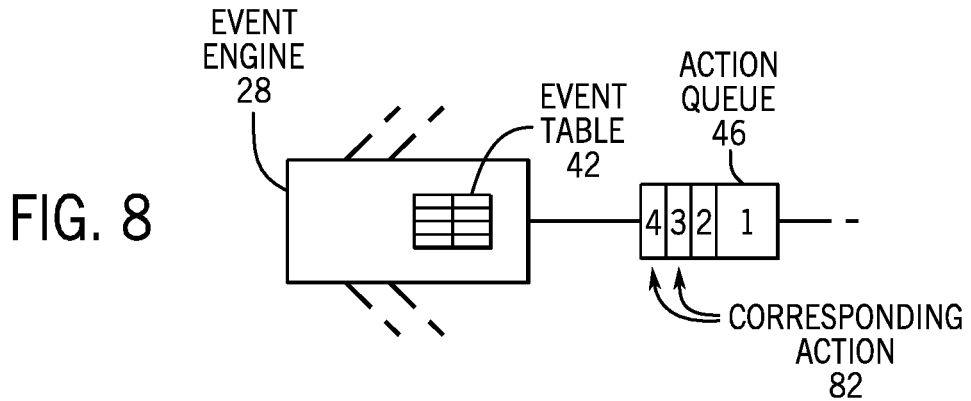
FIG. 8 is a fragmentary view of FIG. 2 showing the generation of actions by the event engine responsive to the events generated in FIG. 7.

Referring now to FIG. 8, event engine 28 monitoring the event/data queue 40 applies these events to the event table 42 to produce action outputs 1, 2, 3, and 4 which are loaded into the action queue 46. Once these events have been decoded, the entries in the source event/data queues 34, 36, 38, 40 having valid states that are the source of generated actions have the relevant valid flags reset so the computation block 32 may perform the next set of calculations to provide new "valid" test calculations as appropriate.

Figure 6:
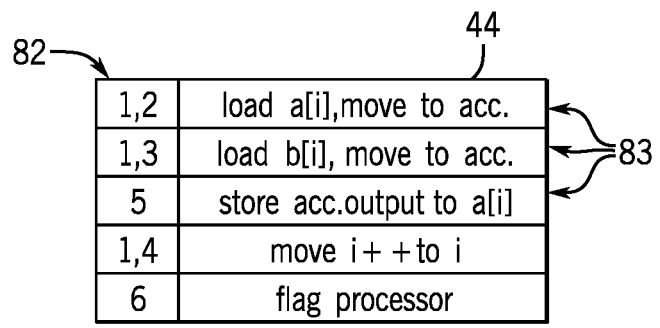
FIG. 6 is a logical diagram of the action table used by the action engine of FIG. 2.
Figure 9:
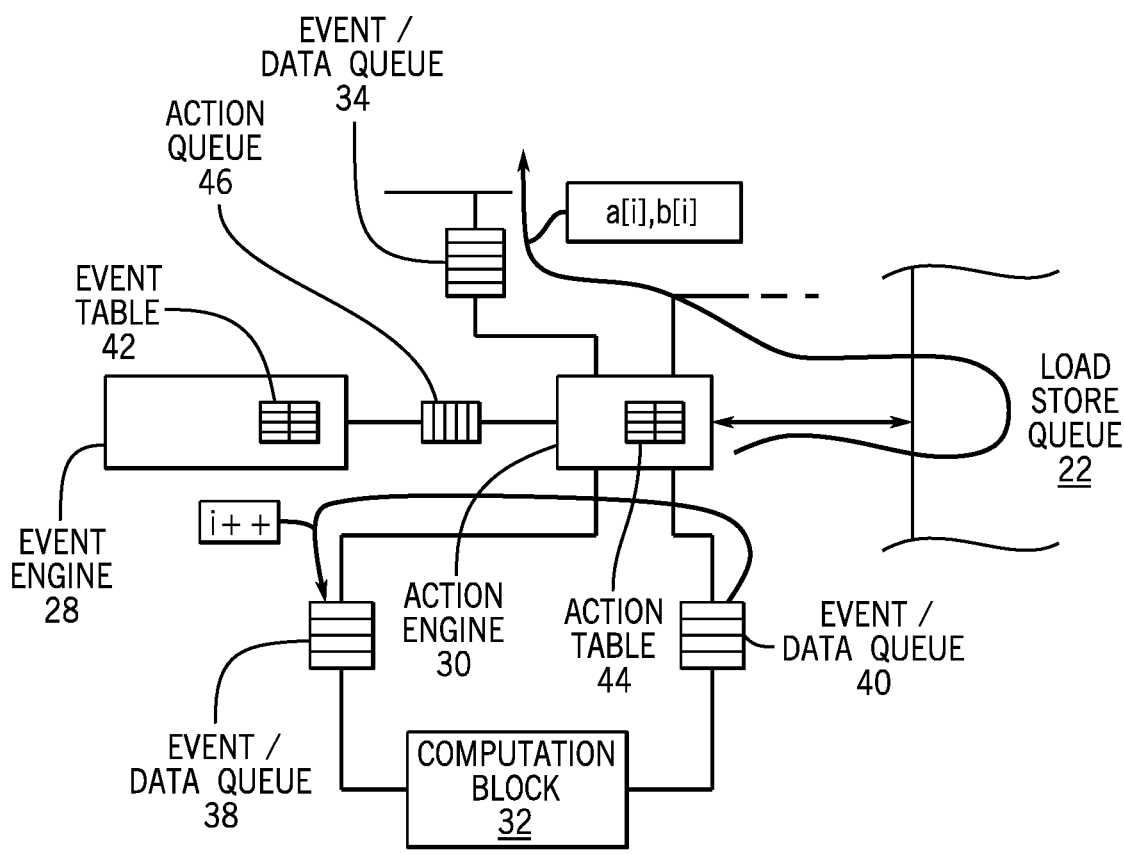
FIG. 9 is a fragmentary view of FIG. 2 showing data routing provided by the action engine based on the actions generated by the event engine of FIG. 8.

Referring now to FIG. 9, the action engine 30 responds with actions of the first second and third rows of the action table 44 of FIG. 6 communicating with the load store queue 22 to provide new addresses to access new values of a[i] and b[i] and move those to the accelerator processor 24 through event/data queue 34. The action engine 30 further moves the incremented value of i from the event/data queue 40 to the event/data queue 38 to be provided to a register holding the value of i in the computation block 32. Once these actions have been implemented, the entries in the source event/data queues 34, 36, 38, 40 having ready states that are the source of generated actions have the relevant ready flags reset so the computation block 32 may perform the next set of calculations to provide new "ready" address calculations as appropriate.

Figure 10:
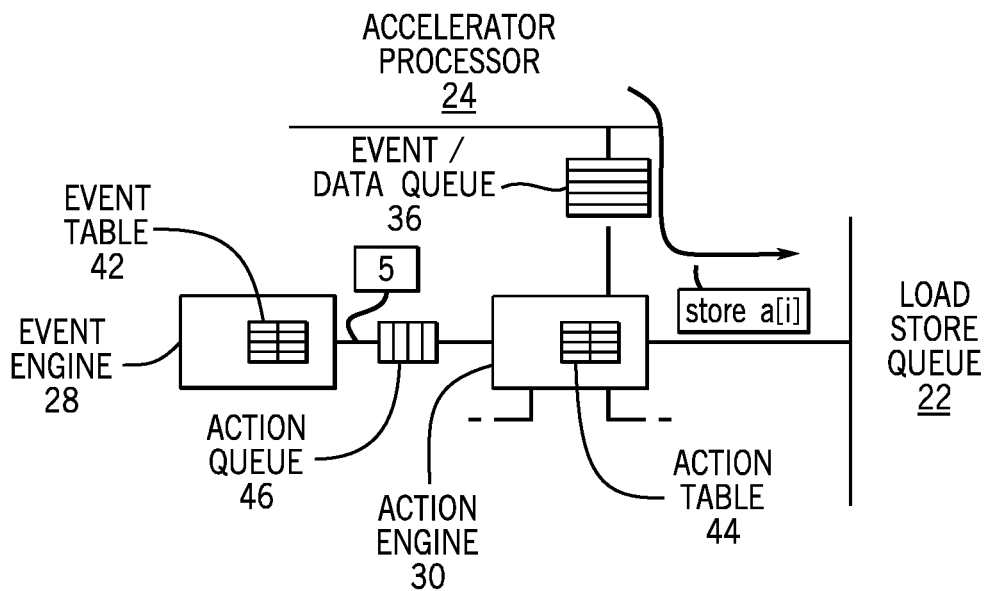
FIG. 10 is a fragmentary view of FIG. 2 showing data routing provided by the action engine based on actions generated by the event engine in FIG. 8.

Referring now to FIG. 10, at some point the accelerator processor 24 will provide an output to event/data queue 36 causing the event 5 of event table 42 to be detected by the event engine 28 and action 5 communicated to the action engine 30. This action 5 triggers the third action task (third row) of the action table 44 of FIG. 6 to store the value from event/data queue 36 in memory through the load store queue 22. Generally this data value may arrive asynchronously with respect to other actions.

Figure 11:
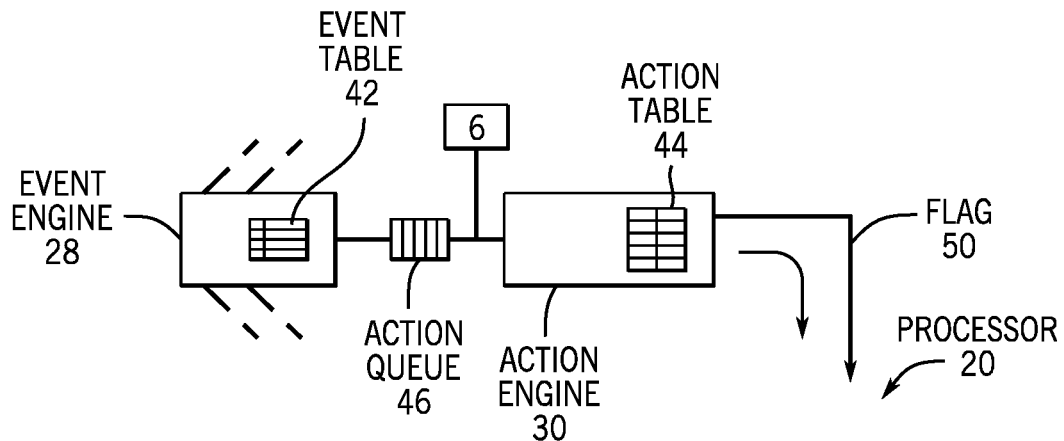
FIG. 11 is a fragmentary view of FIG. 2 showing a return of control to the main processor.

Finally as shown in FIG. 11, when the loop condition reaches i>=n as detected by the computation block 32 (at the end of the loop), action 6 is generated by the event engine 28 resulting in an action task which flags to the general processor 20 to return control to the general processor 20.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computer comprising:
   a first processor communicating with an external memory and including circuitry to provide execution of a first set of standard computer instructions and circuitry for an exchange of data with the external memory;
   a second processor communicating with the first processor including circuitry to provide execution of a second set of accelerator computer instructions providing the execution of functions at an accelerated rate compared to the execution of those functions on the first processor;
   a third processor communicating with the first processor and the second processor and including instruction storage circuitry and execution circuitry to provide for the execution of a set of memory access instructions held in the instruction storage circuitry, the third processor operating to:
   (1) be configured by the first processor to receive the set of memory access instructions from the first processor into the instruction storage circuitry, the set of memory access instructions including:
      (a) multiple event instructions defining events that will trigger actions needed for accessing memory,
      (b) multiple action instruction defining data transfer operations,
      (c) multiple initialization values operated on by the event instructions including base addresses, and
      (d) multiple calculations needed for computation of memory addresses; and
   (2) after configuration by the first processor to execute the memory access instructions in the instruction storage circuitry using the execution circuitry to exchange data between the second processor and external memory during operation of the second processor the exchange of data being according to the event instructions and action instructions describing data transfer operations operating on memory locations defined by the initialization values.

2. The computer of claim 1 wherein the circuitry of the third processor executing the set of memory access instructions provides for the exchange of data between the second processor and the external memory via the third processor using less power than required for the exchange of data between the second processor and the external memory via the first processor.

3. The computer of claim 2 wherein the first processor is an out-of-order processor speculatively executing instructions out of program order.

4. The computer of claim 3 wherein the third processor employs a trigger architecture for sequencing through the third set of memory access instructions without a program counter.

5. The computer of claim 4 wherein the set of memory access instructions includes a list of trigger events and responses, where the trigger events include an availability of data from the second processor or memory and the responses include moving data between the second processor and external memory.

6. The computer of claim 1 wherein the set of memory access instructions includes a data flow fabric configuration for calculating addresses in the external memory.

7. The computer of claim 1 wherein the first processor provides the second set of accelerator computer instructions to the second processor.

8. The computer of claim 1 wherein the computer shuts down the first processor during operation of the third processor.

9. The computer of claim 1 wherein the second processor does not include circuitry for the exchange of data with the external memory.

10. The computer of claim 1 wherein the first processor provides initial memory access data to the third processor.

11. The computer of claim 1 wherein the set of memory access instructions is limited to those needed to provide iterative calculation of memory addresses in a predictable pattern of offsets starting with an initial memory access data provided from the first processor.

12. The computer of claim 1 wherein the second processor is selected from the group consisting of an arithmetic coprocessor, a graphic coprocessor, a streaming processor, and a neural net processor.

13. The computer of claim 1 wherein the first processor sends the set of memory access instructions to the third processor based on compiler-generated instructions in a program executed by the first processor.

14. A method of executing a program using a computer having:
- a first processor communicating with an external memory and including circuitry to provide execution of a first set of standard computer instructions and circuitry for an exchange of data with the external memory;
- a second processor communicating with the first processor including circuitry to provide execution of a second set of accelerator computer instructions providing the execution of functions at an accelerated rate compared to the execution of those functions on the first processor; and
- a third processor communicating with the first processor and the second processor and including instruction storage circuitry and execution circuitry to provide for the execution of a set of memory access instructions held in the instruction storage circuitry, the third processor operating to receive the set of memory access instructions from the first processor, the set of memory access instructions including:
  (a) multiple event instructions defining events that will trigger actions needed for accessing memory,
  (b) multiple action instruction defining data transfer operations,
  (c) multiple initialization values operated on by the event instructions including base addresses, for programming of the third processor to exchange data between the second processor and external memory during operation of the second processor; a
  (d) multiple calculations needed for computation of memory addresses; and the method comprising the steps of:
(a) executing a program by the first processor to a beginning of an acceleration region of the program where faster execution could be provided by the second processor;
(b) providing multiple event instructions by the first processor defining events that will trigger actions needed for accessing memory, multiple action instruction defining data transfer operations, multiple initialization values operated on by the event instructions including base addresses, and multiple calculations needed for computation of memory addresses to the third processor for accessing memory for the second processor for execution of the acceleration region; and
(c) after configuration of the third processor by the first processor, executing the memory access instructions in the instruction storage circuitry by the third processor using the execution circuitry to exchange data between the second processor and external memory during operation of the second processor, the exchange of data being according to the event instructions, calculations, and action instructions describing data transfer operations operating on memory locations defined by the initialization values, to execute the acceleration region by the second and third processor and not by the first processor.

15. The method of claim 14 wherein during step (c) the first processor is operated in a reduced power mode consuming less power than in step (a).

16. The method of claim 14 including the step of the first processor providing the second set of accelerator computer instructions to the second processor.

17. The method of claim 14 wherein the second processor does not access the external memory except via the third processor.

18. The method of claim 14 including the step of the first processor providing initial memory access data to the third processor.

19. The method of claim 14 wherein the first processor speculatively executes instructions of the program before the acceleration region out of program order.

20. The method of claim 14 wherein the third processor provides instructions limited to three primitive tasks of:
(i) computation to generate recurring address patterns/branches;
(ii) managing and triggering recurring events related to an arrival of values from memory or the second processor; and
(iii) moving information between memory and the second processor.

* * * * *